United States Patent
Smith

(10) Patent No.: US 12,491,746 B1
(45) Date of Patent: Dec. 9, 2025

(54) SHOCK STIFFENER SYSTEM

(71) Applicant: Shock Therapy Suspension, Inc., Duluth, GA (US)

(72) Inventor: Justin Smith, Wittmann, AZ (US)

(73) Assignee: Shock Therapy Suspension, Inc., Duluth, GA (US)

( * ) Notice: Subject to any disclaimer, the term of this patent is extended or adjusted under 35 U.S.C. 154(b) by 0 days.

(21) Appl. No.: 18/926,921

(22) Filed: Oct. 25, 2024

(51) Int. Cl.
*B60G 17/016* (2006.01)
*B60G 13/08* (2006.01)
(Continued)

(52) U.S. Cl.
CPC .......... *B60G 17/019* (2013.01); *B60G 13/08* (2013.01); *B60G 15/062* (2013.01); *B60G 17/0152* (2013.01); *B60G 17/016* (2013.01); *B60G 17/08* (2013.01); *B62D 5/0484* (2013.01); *F16F 9/46* (2013.01); *F16F 9/50* (2013.01);
(Continued)

(58) Field of Classification Search
CPC .. B60G 17/016; B60G 17/018; B60G 17/019; B60G 17/08; B60G 17/0161; B60G 17/0162; B60G 17/0163; B60G 17/0164; B60G 17/0165; B60G 17/06; B60G 17/015; B60G 17/0152; B60G 2400/10; B60G 2400/30; B60G 2400/40; B60G 2400/39; B60G 2400/33; B60G 2400/34; B60G 2400/41; B60G 2400/44; B60G 2400/5182; B60G 2500/10; B60G 2500/11; B60G 2600/182; B60G 2600/184; B60G 2600/20; B60G 2600/21; B60G 2600/73; B60G 2600/26; B60G 2600/18; B60G 2202/00; B60G 2202/20; B60G 2202/24; B60G 2202/25; B60G 2202/322; B60G 2300/07; B60G 2300/12; B60G 2300/124; B60G 13/08; B60G 13/06; B60G 2206/40; B60G 2206/41; B60G 2204/62; B60G 15/06; B60G 15/062; B60G 2800/91;
(Continued)

(56) References Cited

U.S. PATENT DOCUMENTS

| | | |
|---|---|---|
| 10,556,477 B2 | 2/2020 | Marking |
| 10,987,987 B2 | 4/2021 | Graus et al. |

(Continued)

FOREIGN PATENT DOCUMENTS

| | | |
|---|---|---|
| EP | 3290738 | 7/2018 |
| JP | 2008008390 | 1/2008 |

*Primary Examiner* — Keith J Frisby
(74) *Attorney, Agent, or Firm* — Schmeiser, Olsen & Watts LLP

(57) ABSTRACT

Provided is an automatically controlled shock stiffening system. The automatically controlled shock stiffening system may include an electronic control unit receiving sensor input which automatically stiffens and softens a shock during operation. An override button is provided to immediately stiffen the shock in response to a user activating the override button. The system may include a main body with an oil flow aperture and a flow control system that operates to restrict the flow of oil between the reservoir and the shock. The automatically controlled shock stiffening system may be coupled between the reservoir and the bridge of the shock and operates to restrict flow of the oil in order to stiffen the shock immediately in response to activation of the override button.

7 Claims, 3 Drawing Sheets

(51) Int. Cl.
*B60G 15/06* (2006.01)
*B60G 17/015* (2006.01)
*B60G 17/019* (2006.01)
*B60G 17/08* (2006.01)
*B62D 5/04* (2006.01)
*F16F 9/46* (2006.01)
*F16F 9/50* (2006.01)
*B62K 25/04* (2006.01)

(52) U.S. Cl.
CPC .... *B60G 2202/24* (2013.01); *B60G 2202/322* (2013.01); *B60G 2204/62* (2013.01); *B60G 2206/41* (2013.01); *B60G 2300/07* (2013.01); *B60G 2400/10* (2013.01); *B60G 2400/30* (2013.01); *B60G 2400/33* (2013.01); *B60G 2400/34* (2013.01); *B60G 2400/39* (2013.01); *B60G 2400/40* (2013.01); *B60G 2400/41* (2013.01); *B60G 2500/10* (2013.01); *B60G 2600/18* (2013.01); *B60G 2600/182* (2013.01); *B60G 2600/20* (2013.01); *B60G 2600/21* (2013.01); *B60G 2600/26* (2013.01); *B60G 2600/73* (2013.01); *B60G 2800/91* (2013.01); *B62K 2025/044* (2013.01)

(58) Field of Classification Search
CPC .......... F16F 2286/066; F16F 9/50; F16F 9/46; B62K 2025/044; B62D 5/0484

USPC ......... 280/5.5, 5.512, 5.515, 5.519, 124.157; 701/37

See application file for complete search history.

(56) References Cited

U.S. PATENT DOCUMENTS

| | | | |
|---|---|---|---|
| 11,479,075 B2* | 10/2022 | Graus | B60G 17/08 |
| 11,618,296 B2 | 4/2023 | Smith | |
| 2012/0018263 A1 | 1/2012 | Marking | |
| 2013/0328277 A1 | 12/2013 | Ryan et al. | |
| 2014/0125018 A1* | 5/2014 | Brady | B60G 17/016 |
| | | | 280/5.519 |
| 2015/0081171 A1 | 3/2015 | Ericksen et al. | |
| 2018/0328445 A1 | 11/2018 | Gilbert | |
| 2019/0176557 A1* | 6/2019 | Marking | F16F 9/462 |
| 2020/0269647 A1 | 8/2020 | Strickland et al. | |
| 2020/0307340 A1* | 10/2020 | Yao | B60G 17/06 |
| 2021/0108696 A1 | 4/2021 | Randall | |
| 2021/0179226 A1 | 6/2021 | Santurbane et al. | |
| 2021/0268860 A1 | 9/2021 | Randall | |
| 2021/0276385 A1 | 9/2021 | Smith | |
| 2022/0016949 A1* | 1/2022 | Graus | B60G 17/08 |
| 2022/0163088 A1 | 5/2022 | Gagnon | |
| 2024/0092135 A1* | 3/2024 | Randall | B60G 17/08 |

* cited by examiner

SHOCK STIFFENER SYSTEM

BACKGROUND OF THE INVENTION

Technical Field

This invention relates generally to shocks for a vehicle and more particularly to an automatically controlled shock stiffener system with an override for immediately stiffening a shock.

State of the Art

The use of off-road vehicles (ORVs), such as utility terrain vehicles (UTVs), are common, and often the desire of drivers and passengers of a UTV is for the shocks to operate in a soft condition. This allows the UTV to engage bumps and rough areas of road and paths driven with reduced jarring or vibration for the passengers. However, there are moments during the operation of the UTV where the shocks need to be stiff, such as after a jump or a sharp drop or other obstacle where the UTV may bottom out. There are not aftermarket systems that exist to allow an automatically controlled stiffening of the shocks with a manual override.

Accordingly, there is a need for an aftermarket system that provides automatic control of stiffening of the shocks with a manual override.

SUMMARY OF THE INVENTION

The present invention relates to an automatically controlled shock stiffening system. The automatically controlled shock stiffening system operates to stiffen or soften the shocks in response to sensor input to an electronic control unit (ECU). The automatically controlled shock stiffening system provides an override of the ECU for the user to immediately stiffen the shocks at will based on riding conditions.

An embodiment includes an automatically controlled shock stiffening system, comprising: a main body configured to be coupled between a shock and an oil reservoir of an assembled hydraulic shock system of a vehicle; a flow control system coupled to or integral to the main body and changeable between an engaged position, in which oil flow between the shock and the oil reservoir is restricted, and a disengaged position, in which oil flow between the shock and the oil reservoir is unrestricted; an electronic control unit configured to be coupled to the vehicle, a coupling coupled between the electronic control unit and the flow control system to establish communication between the electronic control unit and the flow control system, wherein the flow control system changes automatically between the engaged position and the disengaged position in response to operation of the electronic control unit; at least one sensor coupled to the electronic control unit, wherein the at least one sensor provides input relative to operation of the vehicle; and an override button coupled to the vehicle within a driver compartment of the vehicle, wherein the override button communicates with the electronic control unit in order to override the flow control system.

The flow control system may comprise: at least one oil flow aperture through the main body, the at least one oil flow aperture being in fluid communication with the shock and the oil reservoir; a channel through the main body; a plunger slidingly coupled within the channel, wherein the plunger is changeable from an engaged position, in which the plunger is positioned to block the oil flow aperture so as to restrict oil flow through the oil flow aperture, and a disengaged position, in which the plunger is positioned away from the oil flow aperture so as to allow unrestricted oil flow through the oil flow aperture; and a solenoid coupled between the plunger and the coupling, wherein the plunger is changed between the engaged position and the disengaged position in response to engagement and disengagement of the solenoid in response to operation of the electronic control unit.

The automatically controlled shock stiffening system may further comprise at least one bypass aperture through the main body, the at least one bypass aperture being in fluid communication with the shock and the oil reservoir, wherein oil flows through the at least one bypass aperture in response to a predetermined minimum oil pressure differential between the bridge and the oil reservoir. A bridge may be coupled between the shock and the main body, the bridge being in fluid communication with the shock and the main body. The at least one sensor may be a throttle sensor. The at least one sensor may be a brake sensor. The at least one sensor may be a steering sensor.

Another embodiment includes a method of using an automatically controlled shock stiffening system, comprising: coupling an automatically controlled shock stiffening system between an oil reservoir and a bridge of a shock system; providing an electronic control unit to control the automatically controlled shock stiffening system; operating a flow control system in response to the electronic control unit; coupling at least one sensor to the electronic control unit; providing input from the at least one sensor relative to operation of a vehicle; restricting or unrestricting oil flow between a vehicle shock and the oil reservoir in response to the automatically operating the flow control system; stiffening or softening the vehicle shock in response to the restricting or unrestricting the oil flow between the vehicle shock and the oil reservoir; and overriding the flow control system in response to engaging an override button to enable manual engagement of the flow control system dependent upon operating conditions of the vehicle.

The manual engagement of the flow control system may comprise: engaging a solenoid; and sliding a plunger, coupled to the solenoid, to an engaged position, in response to engaging the solenoid. The at least one sensor may be a throttle sensor. The at least one sensor may be a brake sensor. The at least one sensor may be a steering sensor.

Another embodiment includes a method of using an automatically controlled shock stiffening system, comprising: operating a flow control system in response to an electronic control unit coupled to at least one sensor operating to restrict or unrestrict oil flow between a vehicle shock and an oil reservoir in response to input from the at least one sensor; stiffening or softening the vehicle shock in response to the restricting or unrestricting the oil flow between the vehicle shock and the oil reservoir; overriding the flow control system in response to engaging an override button to enable manual engagement of the flow control system dependent upon operating conditions of the vehicle; and avoiding activating limp mode of the vehicle when the override button is engaged.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to an automatically controlled shock stiffening system. The automatically controlled shock stiffening system operates to stiffen or soften the shock in response to an ECU receiving vehicle sensor(s) input. The automatically controlled shock system further provides an override for the user to immediately stiffen the shock at will based on riding conditions.

In the present invention, a shock that is electronically controlled by an ECU is softened or stiffened up while driving using sensor input to tune the shock on the fly (while moving). An override button may be added allowing a driver to hit the override button and make the shock full stiff in a panic situation, so the vehicle does not bottom out whereby the override button interrupts the ability of the ECU to control the shock.

Figure 1:
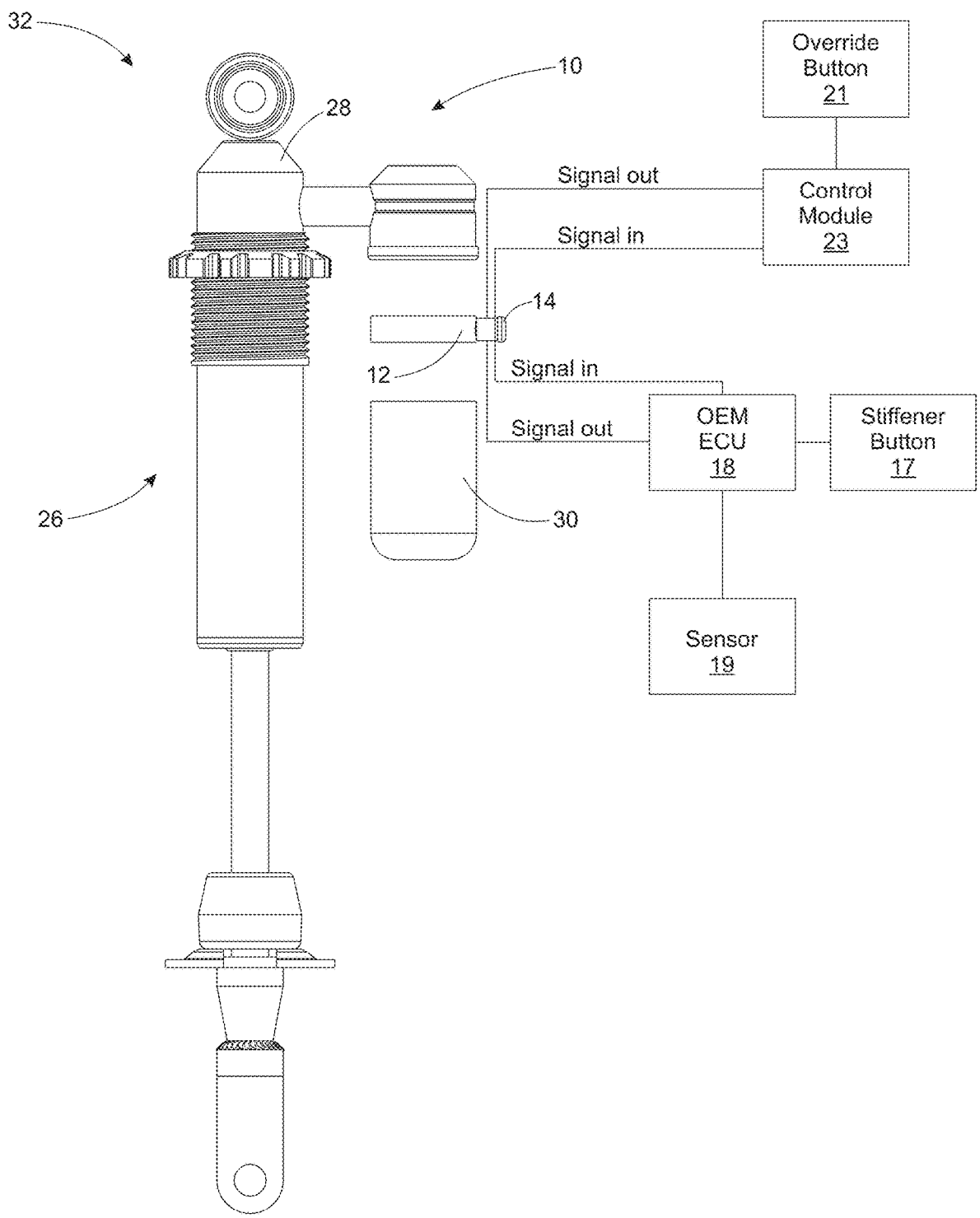
FIG. 1 is a partially-exploded perspective view of a shock stiffening system in accordance with an embodiment.
Figure 2A:
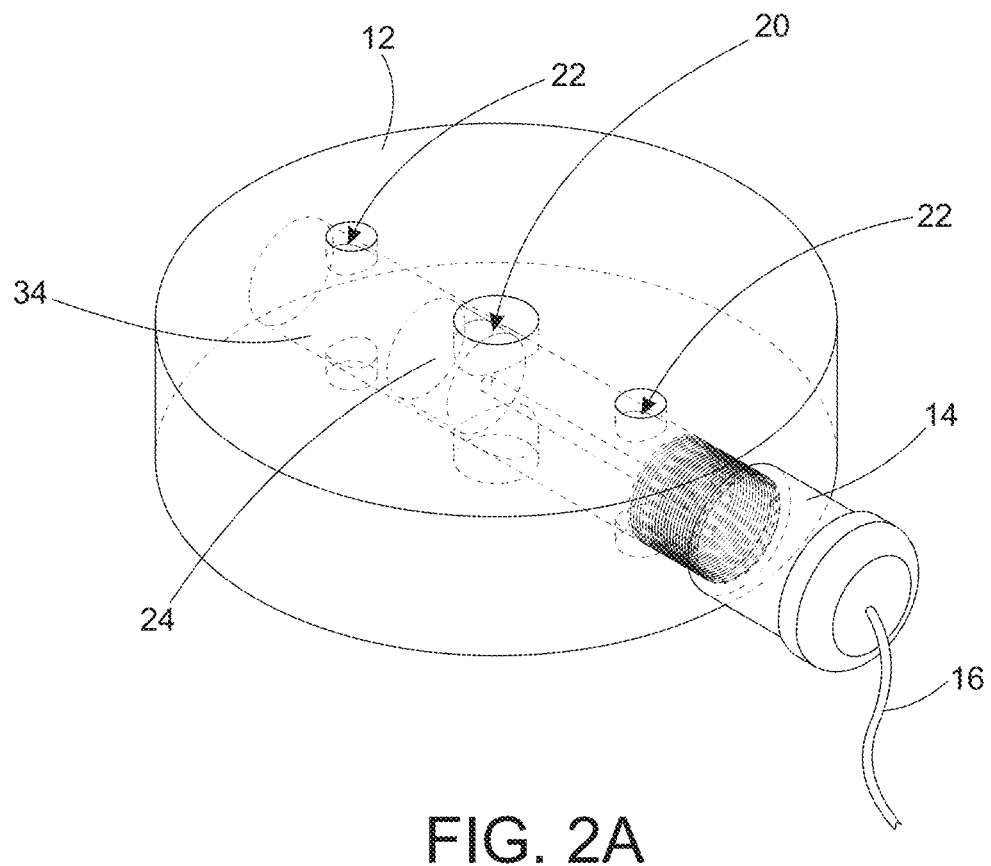
FIG. 2A is a perspective view of a flow control system of a shock stiffening system in accordance with an embodiment.
Figure 2B:
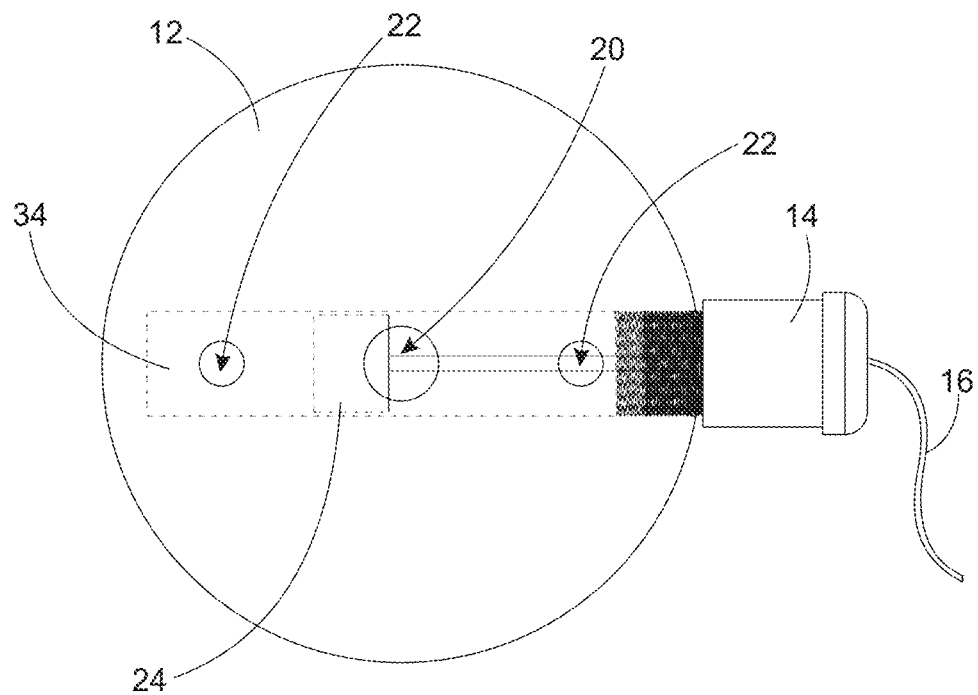
FIG. 2B is a top view of a flow control system of a shock stiffening system in accordance with the embodiment of FIG. 2A.

As shown in FIGS. 1, 2A and 2B, the automatically controlled shock stiffening system 10 may be coupled to a hydraulic shock system 32 of a vehicle. The hydraulic shock system 32 may typically include a shock 26, a bridge 28 coupled to the shock 26, and an oil reservoir 30, wherein the oil reservoir 30 is coupled to the bridge 28 in order to supply oil to the shock 26. A main body 12 of the shock stiffening system 10 is coupled between the oil reservoir 30 and the bridge 28. The system 10 may be coupled to any hydraulic shock system and operate to stiffen or soften any shock of the hydraulic shock system in an automatically controlled manner.

The automatically controlled shock stiffening system 10 may include a main body 12 having an oil flow aperture 20 extending through the main body 12. Additionally, there are bypass apertures 22 that extend through the main body 12. The system 10 may include a flow control system that operates to stop the flow of oil through the oil flow aperture 20. In one embodiment, the flow control system includes a solenoid 14 coupled to a plunger 24. The plunger 24 is slidably coupled within a plunger channel 34 of the main body 12. The solenoid 14 is coupled to an electronic control unit (ECU) 18 by a coupler 16, which may be a wired coupler or a wireless coupler. The ECU 18 electronically controls solenoid 14 using input from at least one sensor 19, such as input from throttle, brake, and/or steering sensors, to tune shock 26 on the fly, or by using input from a stiffener button 17 that can be depressed in order to control solenoid 14.

The solenoid 14 is electric and is operable by operation of the ECU 18 that supplies power to the solenoid 14. Activation of the solenoid 14 by ECU 18 moves the plunger 24, within the plunger channel 34, to an engaged position that blocks flow of the oil between the reservoir 30 and the shock 26 through the bridge 28. The restriction of flow of oil through the oil flow aperture 20 prevents the shock 26 from compressing and keeps the shock 26 stiff or rigid.

Override button 21 coupled to a control module 23 is provided between the ECU 18 and the solenoid 14 within the driver compartment, allowing a driver to hit the override button and make the shock full stiff in a panic situation, so a vehicle does not bottom out. The override button 21 sends a signal to control module 23 that is programmed to interrupt the control of ECU 18 with the solenoid 14, however, the override button 21 does not cause the ECU 18 to register any sensor error or malfunction of the automatically controlled shock stiffening system 10 that may cause the vehicle to transition into a limp mode, reducing speed at which the vehicle can travel and switching off non-essential functions. The override button 21 may be, without limitation, a push button, or any other type of manual switch.

With the restriction of flow of oil through the oil flow aperture by the plunger 24 being in the engaged position, pressure build up in the system can be an issue. The bypass oil apertures 22 are provided to allow oil to flow through the bypass apertures 22 in the event that the pressure of the oil reaches a predetermined level that requires flow through the bypass apertures 22. The ECU 18 may deactivate the solenoid 14 and the plunger 24 is moved to a disengaged position not blocking the oil flow aperture 20.

Figure 3:
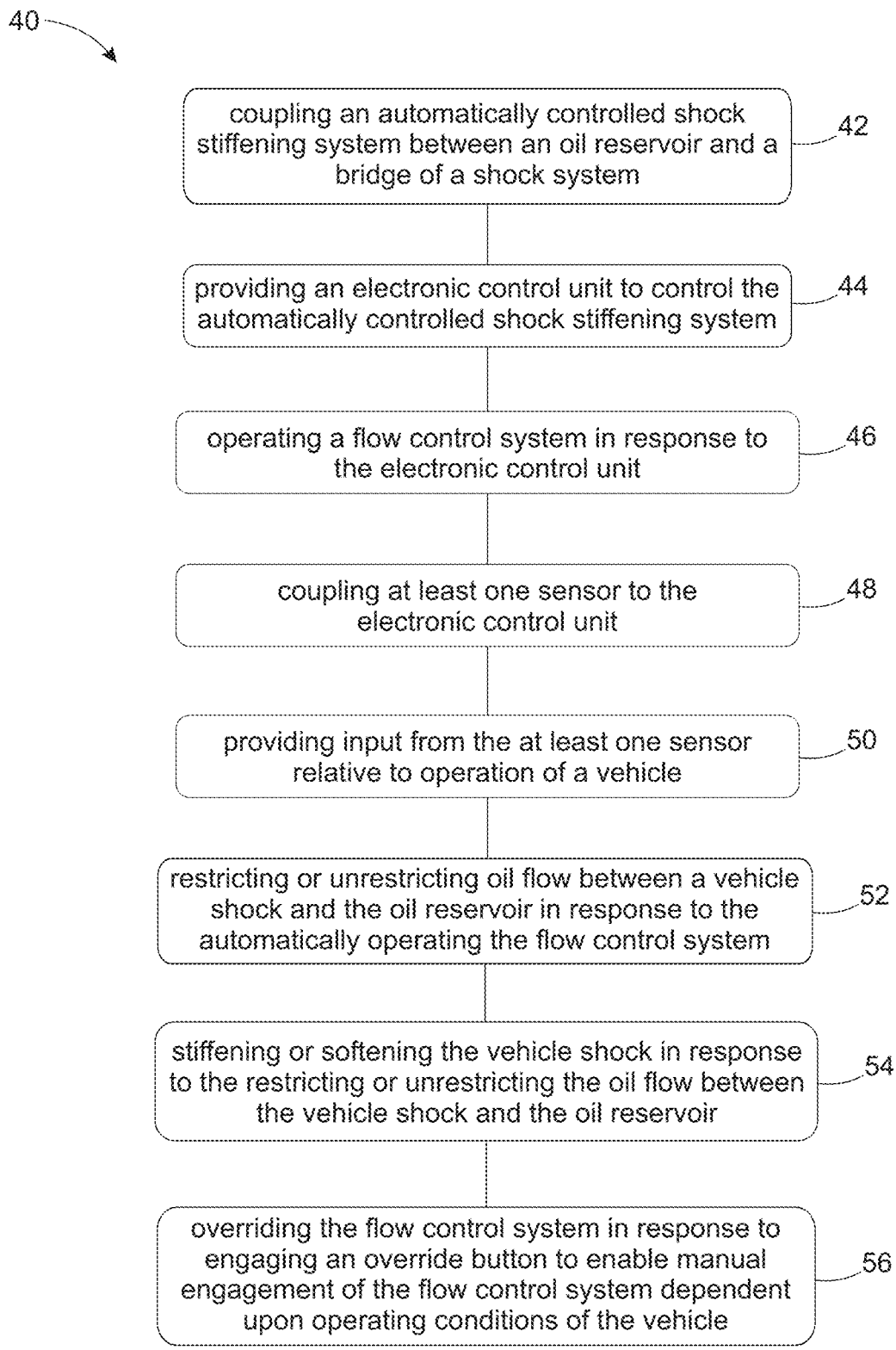
FIG. 3 is a block diagram of steps of a method of use of a shock stiffening system in accordance with an embodiment.

FIG. 3 is a block diagram of steps of a method 40 of using the automatically controlled shock stiffening system 10 that may include: coupling an automatically controlled shock stiffening system between an oil reservoir and a bridge of a shock system [Step 42]; providing an electronic control unit to control the automatically controlled shock stiffening system [Step 44]; operating a flow control system in response to the electronic control unit [Step 46]; coupling at least one sensor to the electronic control unit [Step 48]; providing input from the at least one sensor relative to operation of a vehicle [Step 50]; restricting or unrestricting oil flow between a vehicle shock and the oil reservoir in response to the automatically operating the flow control system [Step 52]; stiffening or softening the vehicle shock in response to the restricting or unrestricting the oil flow between the vehicle shock and the oil reservoir [Step 54]; and overriding the flow control system in response to engaging an override button to enable manual engagement of the flow control system dependent upon operating conditions of the vehicle [Step 56]. The method 40 may also include a step avoiding activating limp mode of the vehicle when the override button is engaged.

While the flow control system is depicted as a solenoid 14 with a plunger 24, it will be understood that any type of flow control system may be utilized so long as the system restricts flow of oil between the reservoir 30 and the shock 26 in response to operating the ECU 18.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An automatically controlled shock stiffening system, comprising:
   a main body configured to be coupled between a shock and an oil reservoir of an assembled hydraulic shock system of a vehicle;
   a flow control system coupled to or integral to the main body and changeable between an engaged position, in which oil flow between the shock and the oil reservoir is restricted, and a disengaged position, in which oil flow between the shock and the oil reservoir is unrestricted;
   an electronic control unit configured to be coupled to the vehicle;
   a coupling coupled between the electronic control unit and the flow control system to establish communication between the electronic control unit and the flow control system, wherein the flow control system changes automatically between the engaged position and the disengaged position in response to operation of the electronic control unit;
   at least one sensor coupled to the electronic control unit, wherein the at least one sensor provides input relative to operation of the vehicle; and
   an override button coupled to the vehicle within a driver compartment of the vehicle, wherein the override button is coupled to a control module positioned between the electronic control unit and the flow control system, and wherein the control module is programmed to interrupt control of the electronic control unit without causing the electronic control unit to register a sensor error or malfunction causing the vehicle to go into limp mode.

2. The system of claim 1, wherein the flow control system comprises:
   at least one oil flow aperture through the main body, the at least one oil flow aperture being in fluid communication with the shock and the oil reservoir;
   a channel through the main body;
   a plunger slidingly coupled within the channel, wherein the plunger is changeable from an engaged position, in which the plunger is positioned to block the oil flow aperture so as to restrict oil flow through the oil flow aperture, and a disengaged position, in which the plunger is positioned away from the oil flow aperture so as to allow unrestricted oil flow through the oil flow aperture; and
   a solenoid coupled between the plunger and the coupling, wherein the plunger is changed between the engaged position and the disengaged position in response to engagement and disengagement of the solenoid in response to operation of the electronic control unit.

3. The system of claim 2, further comprising at least one bypass aperture through the main body, the at least one bypass aperture being in fluid communication with the shock and the oil reservoir, wherein oil flows through the at least one bypass aperture in response to a predetermined minimum oil pressure differential between a bridge and the oil reservoir.

4. The system of claim 3, wherein the bridge is coupled between the shock and the main body, the bridge being in fluid communication with the shock and the main body.

5. The system of claim 1, wherein the at least one sensor is a throttle sensor.

6. The system of claim 1, wherein the at least one sensor is a brake sensor.

7. The system of claim 1, wherein the at least one sensor is a steering sensor.

* * * * *